United States Patent [19]
MacKarvich

[11] Patent Number: 5,880,374
[45] Date of Patent: Mar. 9, 1999

[54] PREMANUFACTURED BUILDING TIE DOWN SYSTEM TESTING RIG

[76] Inventor: Charles J MacKarvich, 1720 Tyler Green Trail, Smyrna, Ga. 30080

[21] Appl. No.: 914,471

[22] Filed: Aug. 19, 1997

[51] Int. Cl.$^6$ .................................................. G01N 19/00
[52] U.S. Cl. ............................................. 73/804; 73/786
[58] Field of Search ........................... 73/804, 807, 849, 73/865.6, 865.8, 170.15, 786

[56] References Cited

U.S. PATENT DOCUMENTS

| | | | |
|---|---|---|---|
| 3,512,404 | 5/1970 | Jureit ........................................ | 73/804 |
| 3,513,803 | 5/1970 | Broden et al. ........................... | 73/849 |
| 3,945,249 | 3/1976 | Knoth ....................................... | 73/819 |
| 5,044,206 | 9/1991 | Williams .................................. | 73/804 |
| 5,212,654 | 5/1993 | Deuar ....................................... | 73/849 |
| 5,722,210 | 3/1998 | Baker et al. ............................. | 52/643 |

*Primary Examiner*—Max H. Noori
*Attorney, Agent, or Firm*—Thomas, Kayden, Horstemeyer & Risley

[57] ABSTRACT

A premanufactured building tie down system testing rig useful in testing the effectiveness of a selected tie down system in resisting high wind forces that could be imposed upon a premanufactured building. The testing rig generally comprises a frame that simulates a cross-section of the premanufactured building, a jack mechanism that imposes a vertical uplift force which simulates the uplift wind forces imposed upon the building, and a winch mechanism that imposes a horizontal force which simulates the horizontal wind forces imposed upon the building.

22 Claims, 3 Drawing Sheets

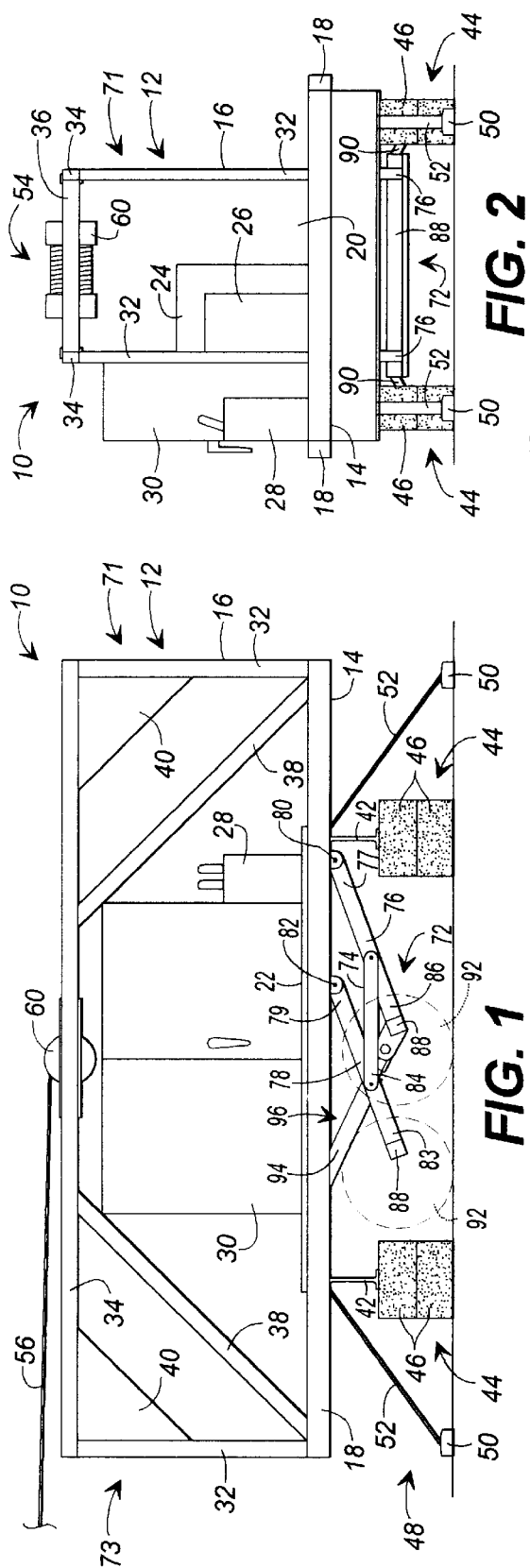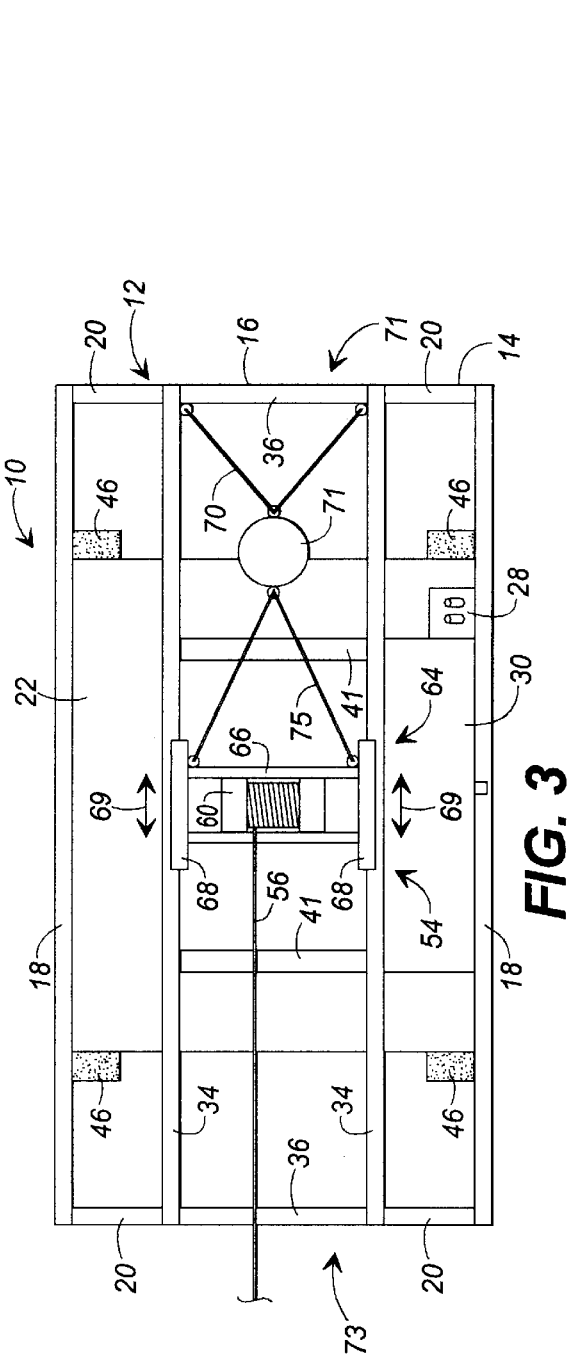

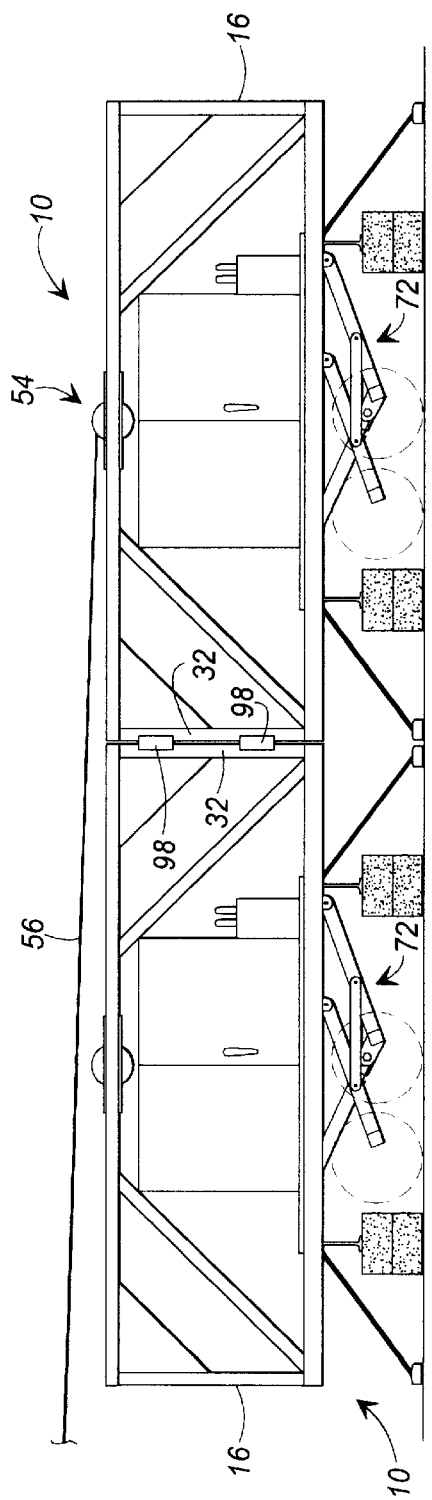
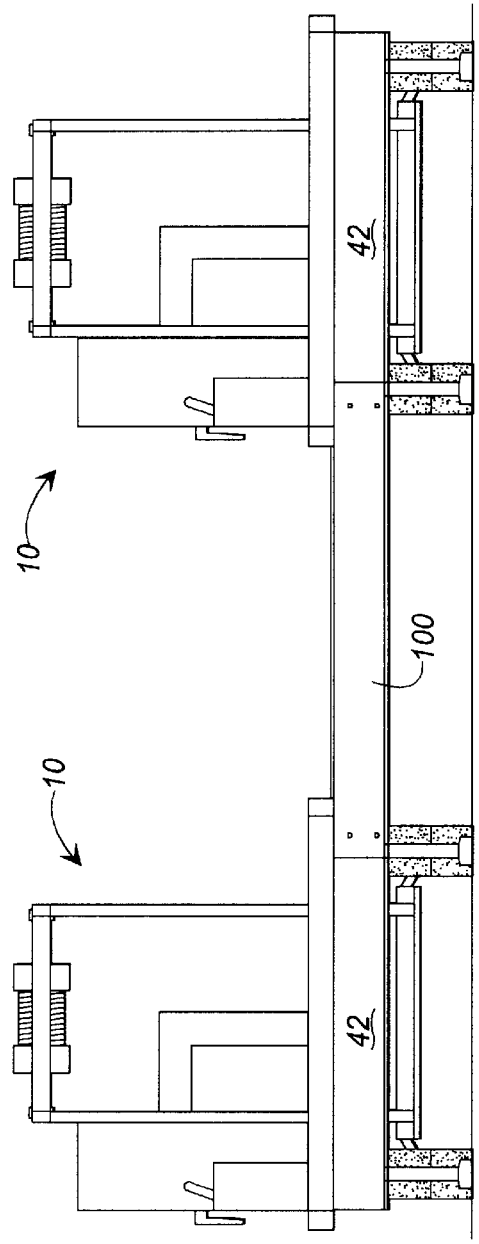
FIG. 4
FIG. 5

PREMANUFACTURED BUILDING TIE DOWN SYSTEM TESTING RIG

FIELD OF THE INVENTION

This invention relates generally to an apparatus for testing the effectiveness of premanufactured building tie down systems. More particularly, the invention relates to a testing rig having a frame that simulates a cross-section of a premanufactured building and loading mechanisms which simulate the effects of wind forces on the cross-section to test the effectiveness of the tie down system in resisting the effects of these forces.

BACKGROUND OF THE INVENTION

Premanufactured buildings, such as mobile homes, trailers, prefabricated houses, and the like are manufactured at a central manufacturing site. Upon completion, the buildings are moved to a location where they are to be occupied. Because these buildings are designed to be easily moved from one site to another, they are not built on permanent foundations but, rather, typically are placed on piers such as concrete blocks, pilings, or stabilizing jacks. If the home is not anchored securely in position, it can be shifted from its position on the blocks or jacks by strong winds. This can cause not only serious damage to the building structure itself but may also cause human injury. Another potential danger is the breakage of gas pipes and subsequent ignition of the escaping gas.

Various types of stabilizing devices have been used to secure premanufactured buildings to keep them from shifting in response to wind forces. Exemplary of such systems are tie down systems that use guy wires or retaining bands and ground anchors to secure the building in place on the piers.

Due to the importance of using the most effective means for building stabilization, and due to the need of meeting the minimum performance standards established by the United States Department of Housing and Urban Development, performance testing has been conducted on various stabilization systems. Until now, this testing has primarily consisted of the testing of the individual components of each particular tie down system. For instance, ground anchors have been tested by measuring the amount of force required to move the anchor a certain distance in the ground. From this data, the effectiveness of the anchor in actual use can be estimated. Similarly, tensile testing of the guy wires and bands has been conducted. However, there have been no testing systems that allow the user to accurately simulate the effects of a wind load on the entire stabilization system at the same time.

Thus, it can be appreciated that it would be desirable to have testing apparatus that tests the entire tie down system by accurately simulating the effects of wind forces on a premanufactured building.

SUMMARY OF THE INVENTION

The present invention relates to a premanufactured building tie down system testing rig that simulates a cross-section of a premanufactured building such as a mobile home and further simulates the wind forces that could be imposed on a premanufactured building to test the effectiveness of the tie down system in securing the building against such forces.

The testing rig comprises a rigid frame formed of a base section and an upper section. The rig is generally rectangular and has opposed ends that represent the windward and leeward sides of a premanufactured building. Mounted to the underside of the base section is a pair of elongated support beams that are of similar construction to support beams typically used under premanufactured buildings. These support beams are mounted to the frame in a spaced, horizontal parallel manner just as they would if mounted to an actual premanufactured home. The beams rest upon support piers that are placed on the ground surface below the testing rig. With the frame positioned atop the support piers, the support beams, and therefore the frame, can be secured in place with tie down system that is to be tested.

To provide for simulation of the horizontal component of wind force on a premanufactured building, the testing rig further includes a horizontal frame loading mechanism that typically comprises a load cable and a hydraulic winch that is operably connected to the windward end of the upper section of the frame. A first end of the load cable is wound about the winch and a second end of the cable is secured about a fixed stationary object that will not move under the influence of the pulling forces that will be imposed by the load cable. During testing, the winch is used to slowly wind the cable against the resistance of the stationary object to create tension in the cable that simulates a horizontal wind force that is applied to the windward side of a premanufactured building.

In one aspect of the invention, the hydraulic winch is slidably mounted to a center portion of the upper section of the frame and tied to the windward end of the frame with a retainer cable to ensure that the horizontal force is applied only to the windward end of the frame just as a wind force would only be applied to the windward side of the premanufactured building. In another aspect of the invention, a tension measuring device is connected between the winch and the retainer cable to measure the amount of tension present in the load cable. This tension represents the magnitude of force that would be applied to the particular section of the premanufactured building by the wind.

To provide for simulation of the vertical component of wind force or uplift on a premanufactured building, the testing rig is also provided with a vertical frame loading mechanism typically configured as a hydraulic jack mechanism such as a hydraulic scissors jack. The jack mechanism includes a proximal portion that is pivotally attached to the underside of the frame and a distal portion that is extendible away from the frame with an extensible hydraulic piston that is similarly pivotally attached to the underside of the frame. In a preferred embodiment, the jack mechanism includes wheels that are rotatably attached to the distal portion of the mechanism. During testing, extension of the jack mechanism causes the wheels to engage the ground surface below the testing rig. Once such engagement is achieved, continued extension imparts a vertical uplifting force against the testing rig, and therefore the tie down system, that simulates the effects of uplift forces of wind that could be imposed upon the premanufactured building. Furthermore, the wheels can be used to transport the testing rig from test site to test site.

In another aspect of the invention, a compression measuring device can be positioned between the wheels of the jack mechanism and the ground surface. This compression measuring device is typically equipped with an internal compression sensor that measures the compression being applied by the wheels on the device and therefore the vertical uplift force that is being applied to the frame and the tie down system.

To conduct testing of a particular premanufactured building tie down system, the testing rig is transported to a selected test site with the leeward end of the frame facing the selected fixed stationary object. The frame is then lifted by extension of the jack mechanism to permit the stacking of concrete blocks on the ground surface underneath each support beam to form the support piers. Once the piers are formed, the jack mechanism is fully retracted so that the frame comes to rest its weight only upon the piers. Next, the tie down system is assembled and secured to the support beams as it would if applied to an actual premanufactured building. Once secured, the compression measuring device is positioned between the wheels of the jack mechanism and the ground surface. The jack mechanism is then extended by the operator until the wheels firmly engage the compression block.

Finally, the load cable is secured to the selected stationary object. To commence testing, both horizontal and vertical forces are applied to the frame with the horizontal load mechanism and the vertical load mechanism respectively through manipulation of the control mechanism, the control mechanism being in fluid communication with these load mechanisms and a hydraulic pump. During the application of these forces, the magnitude of both the horizontal and vertical forces are measured with the force measuring means described above. The force values obtained from these means provide the operator or observer with valuable information with regard to how well a particular premanufactured building tie down system functions and the maximum wind speeds that the particular tie down system can withstand without failing. Furthermore, measured displacement of the ground anchors provide additional indication of the tie down system's effectiveness.

In addition, a pair of testing rigs similar in construction to that described above can be used to simulate the effect of wind forces on a double wide premanufactured building. A simulation of a cross-section of the length of a double wide premanufactured building can be effected by connecting the rigs end-to-end. Testing then can be carried out in the typical manner with the horizontal load being applied with the horizontal load mechanism of the windward rig. Furthermore, a pair of testing rigs of the present invention can be connected side-to-side to simulate a wider cross-section of a single premanufactured building.

Thus, it is an object of this invention to provide testing apparatus for testing the effectiveness of premanufactured building tie down systems.

Another object of this invention is to provide testing apparatus that accurately simulates the effects of both a horizontal component and a vertical uplift component of wind forces that could be imposed upon the premanufactured building.

A further object of this invention is to provide testing apparatus that measures these simulated wind forces to determine the maximum wind loads each tie down system can withstand before failing.

Other objects, features and advantages of this invention will become apparent upon reading the following specification, when taken in conjunction with the accompanying drawings.

BRIEF DESCRIPTION OF THE DRAWINGS

FIG. 1 is a side view of a premanufactured building tie down system testing rig that simulates a cross-section of a premanufactured building.

FIG. 2 is an end view of the windward end of the testing rig illustrated in FIG. 1.

FIG. 3 is a plan view of the testing rig illustrated in FIG. 1 with the power source and hydraulic pump removed for clarity.

FIG. 4 is a side view of a pair of testing rigs that are connected end to end to simulate a double wide premanufactured building.

FIG. 5 is an end view of a pair of testing rigs that are connected side by side to simulate a wide cross-section of a single wide premanufactured building.

DETAILED DESCRIPTION

Figure 6:
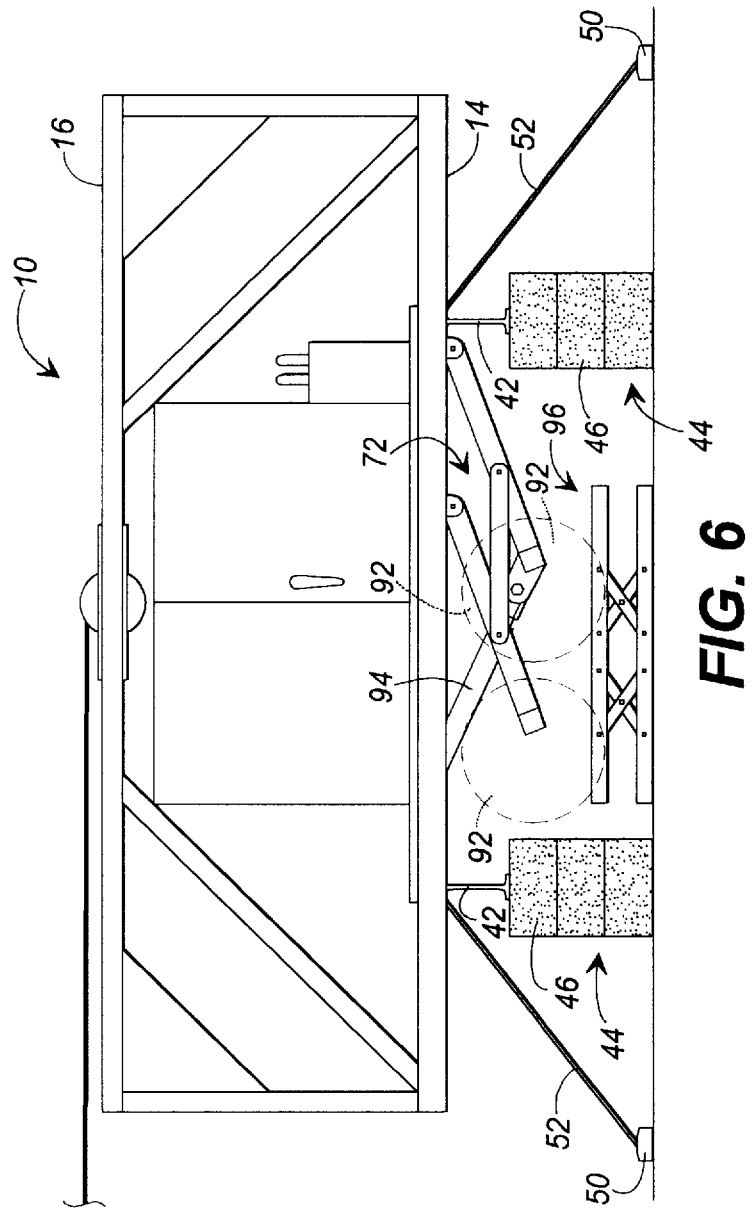
FIG. 6 is a side view of the testing rig illustrated in FIG. 1 and including a compression measuring device.

Referring now in more detail to the drawings, in which like numerals indicate like parts throughout the several views, FIGS. 1–3 illustrate the premanufactured building tie down system testing rig 10. As will be discussed in greater detail below, this testing rig simulates a cross-section of a premanufactured building such as a mobile home. Generally, the testing rig 10 comprises a rigid frame 12 which is composed of a base section 14 and an upper section 16. The base section 14 is substantially rectangular and includes a pair of opposed side beams 18 which each are connected to a pair of opposed end beams 20. Typically, each beam comprising the base section 14 is composed of a metal such as steel, and is configured to have a substantially square cross-section. Bridging the two side beams 18 of the base section 14 is a frame platform 22. Similarly constructed of a metal such as steel, the frame platform 22 is secured to the base portion through welding or fastening with bolts or the like. As depicted in FIG. 2, the platform 22 typically supports various rig components including a power source 24, hydraulic pump 26, hydraulic controls 28, and utility cabinet 30, the purpose of which will be explained below.

The upper section 16 of the frame is mounted atop the base section 14. As shown in FIGS. 1–3, the upper section 16 is substantially rectangular and comprises a plurality of vertical beams 32 that extend upwardly from the base section 14. Typically, these beams are approximately one-half as long as the height of the premanufactured building being simulated. Mounted atop the vertical beams 32 are a pair of opposed side beams 34 that connect to a pair of opposed end beams 36. To provide structural support to the upper frame 16, the frame further includes a plurality of support braces 38 which extend diagonally from the base section 14 to the side beams 34 of the upper section 16. Similar to the beams that form the base section of the frame, the beams which comprise the upper section 16 of the frame are composed of a metal such as steel and are configured to have substantially square cross-sections. Further bolstering the upper section 16 of the frame is a plurality of corner brace plates 40 that are welded to the corners of the upper section of the frame at the meeting points of the vertical beams 32 and the side beams 34, and a pair of cross braces 41 that extend between the side beams 34 (FIG. 3).

Mounted to the underside of the base section 14 is a pair of elongated support beams 42 that simulate support beams that typically are used to support premanufactured buildings. The support beams 42 are usually configured to have an I-shaped cross-section and therefore may be designated as I-beams. As shown most clearly in FIG. 1, the support beams 42 are mounted to the frame in a spaced, horizontal parallel manner just as they would if mounted to an actual premanufactured home. To provide for repositioning of the support beams toward and away from each other along the length of the frame, each support beam 42 is provided with a plurality of mounting holes (not shown) which can be used to bolt the support beams to the frame in any one of several predefined positions along the length of the frame. Like the remainder of the rigid frame 12, the support beams are made of a metal such as steel.

During testing, the support beams 42, and therefore the frame 12, rest on support piers 44 that are placed on the ground surface. Each of the support piers 44 typically comprises a plurality of stacked concrete blocks 46 as conventionally used to support premanufactured buildings. Once the support beams are positioned in place atop the support piers 44, the support beams, and the frame attached thereto, can be secured in place with the premanufactured building tie down system 48 that is to be tested. Although capable of taking any form, the tie down system usually will include a plurality of ground anchors 50 (of which only the head portions are shown) that are buried in the ground and a plurality of retainer straps 52 that are connected to the anchors at one end and connected to an adjacent support beam 42 or some other structural member at the other end.

To provide for simulation of the horizontal component of wind force on a premanufactured building, the testing rig 10 is further provided with a horizontal frame loading mechanism 54. The horizontal frame loading mechanism 54 includes a load cable 56 that has a first end that is wound about a hydraulic winch 60 and a second end that is adapted to secure to a fixed stationary object (not shown). The stationary object will typically be a permanent structure such as an existing immovable structure or a deeply buried post which will not shift when large pulling forces are applied thereto. The winch is in fluid communication with the hydraulic pump 26 such that the winch can be hydraulically operated with the control mechanism 28. In operation, the slack in the load cable 56 can be slowly taken in as it is wound about the hydraulic winch. Once the cable is taut, further winding of the cable against the resistance of the stationary object creates tension in the cable. This tension increases as the winding continues, thereby applying a greater and greater horizontal force to the frame and therefore further and further stressing the tie down system 48 that is being tested. Thus, the winch and cable together function as a tensioning mechanism.

In one aspect of the invention, the hydraulic winch 60 is slidably mounted to a center portion 64 of the side beams 34 of the frame upper section 16. As illustrated in FIG. 3, the winch is mounted to a winch carriage 66 having slide runners 68 on which the winch frame can slide back and forth along the side beams 34 of the upper section 16 as indicated by directional arrows 69. The testing rig further includes a retainer cable 70 that is secured to a windward end 71 of the frame opposite a leeward end 73 of the frame, and operably connected to the winch. Together, the slidable winch carriage 66 and the retainer cable 70 translate the tensile forces in the load cable 56 to the windward end 71 of the frame to concentrate the force at the windward end of the frame which represents the windward side of a premanufactured building. Placed in this manner, the force imposed on the frame more closely simulates the horizontal wind forces that would be imposed upon the premanufactured building.

In another aspect of the invention, a tension measuring device such as a dynamometer 71 can be connected in between the winch carriage 66 and the retainer cable 70 to indicate the amount of tension being applied to the load cable and therefore the amount of force that would be applied to this section of the premanufactured building. When such a measuring device is used, an additional retainer cable 73 is needed to secure the winch carriage 66 to the dynamometer. Typically, the cables and the dynamometer will be arranged so that the scale of the dynamometer faces downward toward the operator controlling the winch or assisting in the testing.

To provide for simulation of the vertical component of wind force or uplift on a premanufactured building, the testing rig 10 is also provided with a vertical frame loading mechanism 72. The vertical frame loading mechanism 72 is typically configured as a hydraulic jack mechanism such as a hydraulic scissors jack 74. As depicted most clearly in FIG. 1, the scissors jack 74 includes front and rear axle arms 76 and 78 having proximal portions 77 and 79 that are pivotally attached to the underside of the base section 14 of the frame with arm mounting brackets 80 and 82. The axle arms 76 and 78 are maintained in a parallel relationship with one another with an axle arm link 84 that is pivotally attached to both axle arms. Mounted to the distal ends 81 and 83 of the axle arms 76 and 78 are front and rear axle housings 86 and 88. From the ends of each axle housing extends torsion axles 90 (FIG. 2) that provide for suspension of wheel 92 that are rotatably mounted to each torsion axle.

Further included in the hydraulic scissors jack 74 is an extensible hydraulic piston 94 having its piston cylinder 96 pivotally attached to the underside of the base section 14 of the frame and its piston arm connected to the front axle housing 86. The hydraulic piston 94 is in fluid communication with the hydraulic pump 26 such that the piston can be extended or retracted with manipulation of the control mechanism 28. In operation, the piston can be extended to likewise extend the distal portion of the front axle arm 76, and thereby the wheels 92, away from the frame. Due to the axle arm link 84, the rear axle arm is likewise extended away from the frame. Extension of the jack mechanism causes the wheels 92 to engage the ground surface below the testing rig 10. Once such engagement is achieved, continued extension imparts a vertical uplifting force against the testing rig 10 that simulates the uplift forces of wind that the premanufactured building could experience.

If desired, a compression measuring device such as a scissors compression block 94 can be positioned between the wheels of the jack mechanism and the ground surface as shown in FIG. 6. This compression block is equipped with an internal compression sensor (not shown) which measures the compression being applied by the wheels against the compression block as the hydraulic piston 96 is extended. This compressive force is equivalent to the vertical uplift force that is being applied to the frame 12 and closely simulates the uplift forces that could be applied to a portion of a premanufactured home. Each sensor is electrically connected to a conventional display device (not shown) contained within the utility cabinet 30 adjacent the control mechanism.

To conduct testing of a particular premanufactured building tie down system, the testing rig 10 is first transported to the test site. Being provided with wheels 92 mounted on torsion axles 90, the transport of the testing rig 10 is greatly simplified, these wheels permitting the rig to be towed from site to site rather than having to be shipped. Upon reaching the selected test site, the rig is positioned with its leeward end 73 facing the selected fixed stationary object. The frame 12 is then raised by extending the wheels 92 downward against the ground surface. During this extension, the power source 24, typically a gasoline powered generator, is used to power the hydraulic pump 26 which is electrically connected thereto. The pump is then operated with the control mechanism 28 to actuate the hydraulic piston 96 and extend the jack 72.

After having adequately raised the frame above the ground surface, the concrete blocks 46 are stacked on the ground surface underneath each support beam 42 to form the support piers 44. Once the piers are formed, the scissors jack 72 can be fully retracted so that the frame rests its full weight upon the piers 44 as would a premanufactured building that is supported upon such piers. Next, the tie down system 48 to be tested is assembled and secured to the support beams 42 as it would if applied to a premanufactured building. It is to be noted that securement of the tie down system will vary depending upon the particular structural elements and configuration the system embodies.

Before testing is commenced, the scissors compression block 94 is positioned between the wheels of the hydraulic scissors jack 72 and the ground surface as shown in FIG. 6. The scissors jack 72 is then extended by the operator until the wheels firmly engage the compression block. The load cable 56 is then secured to the selected fixed stationary object. Ideally, this object will be an immovable object such as an existing structure or deeply buried post. However, temporary fixed objects can be used if configured to withstand the pulling forces that will be imposed during the testing. After the load cable is secured, the slack in the cable is taken up by the hydraulic winch 60. Similar to the hydraulic scissors jack, the hydraulic winch is operated by manipulation of the control mechanism 28.

To most accurately simulate the types of forces that can act upon a premanufactured building in high winds, the horizontal and vertical forces are applied concurrently to the frame through manipulation of the controls. During the imposition of these forces, the magnitude of both the horizontal and vertical forces are measured with the dynamometer 71 and the compression block 94 respectively. The measured horizontal force can be read by the operator by simply looking up at the dynamometer. Additionally, the operator can also read the vertical uplift force values measured in each compression block from the display devices contained in the cabinet.

Both the horizontal force and the vertical uplift force can be increased until either the tie down system 48 or the blocks 46 of the support piers fail. Accordingly, the force values obtained from the force measurement means identified above provide the operator or observer with valuable information with regard to how well a particular premanufactured building tie down system functions and what maximum wind speeds the system can withstand without failure. Furthermore, the magnitude of any displacement of the ground anchors can be directly measured with a yard stick or similar measuring apparatus.

It will be appreciated that since the frame represents only a fractional cross-section of the building, the effects on an entire building and an entire tie down system can be approximated by simple multiplication. For example, if the frame approximates one-third of the length of the home, the measured forces can be multiplied by a factor of three to determine the equivalent force that would be exerted on the entire building. In addition, it is believed that concentration of the horizontal force at the top of the upper section 16 of the frame, which is only half as tall as the building being simulated, accurately simulates the net forces and moments imposed upon an actual premanufactured building.

In addition to the above manner of testing, the testing rig of the present invention can be used to simulate the effect of wind forces on a double wide premanufactured building. As shown in FIG. 4, when two testing rigs 10 are placed end-to-end, a cross-section having the width of a double wide premanufactured building is simulated. To effect connection of the two rigs, mating flanges 98 mounted to the vertical beams 32 of the upper section 16 of each frame are engaged with one another and secured together with conventional fasteners such as bolts. In this configuration, the jack mechanisms 72 of each rig can be used to impart the vertical uplift forces, and the winch mechanism 54 of the windward rig can be used to impart the horizontal forces on the connected frames.

Furthermore, the testing rigs 10 of the present invention can also be connected side-to-side as shown in FIG. 5 if desired. Such connection is effected with the use of bridging support beams 100 that connect to and link the support beams 42 provided on each frame. However, it is believed that accurate testing results can be obtained without such side to side connection of the testing rigs since the forces that would be imposed on the building can be estimated by simply multiplying the observed force values.

While preferred embodiments of the invention have been disclosed in detail in the foregoing description and drawings, it will be understood by those skilled in the art that variations and modifications thereof can be made without departing from the spirit and scope of the invention as set forth in the following claims.

I claim:

1. Testing apparatus for testing a premanufactured building tie down system designed to resist the effects of potential wind forces imposed on a premanufactured building having spaced, horizontal support beams resting on support piers supported by a ground surface, the testing apparatus comprising:

a pair of elongated, spaced, horizontal support beams that simulate the support beams of a premanufactured building;

a frame mounted to said support beams that simulates a cross-section of a premanufactured building;

vertical frame loading means mounted to said frame for providing a lifting force to said frame which simulates a lifting force of wind applied to a premanufactured building; and horizontal frame loading means mounted to said frame for providing a horizontal force to said frame which simulates a horizontal force of wind applied to a premanufactured building.

2. The testing apparatus of claim 1, wherein said horizontal frame loading means includes a winch mounted to said frame and a load cable having a first end wound about said winch and a second end adapted to attach to a fixed stationary object, said winch capable of applying a horizontal force to said frame when the load cable is tensioned by being further wound about said winch against the resistance of the stationary object.

3. The testing apparatus of claim 2, wherein said winch is a hydraulic winch that is slidably mounted to a center portion of said frame and said horizontal frame loading means further includes a retainer cable mounted to a windward end of said frame distal from the fixed stationary object and operably connected to said hydraulic winch such that the horizontal force is applied to said frame at the windward end to accurately simulate the horizontal force that would be applied to a premanufactured building.

4. The testing apparatus of claim 3, further comprising a tension measuring device mounted between said retainer cable and said hydraulic winch, said tension measuring device capable of measuring the tension in said load cable and therefore the horizontal force applied to said frame.

5. The testing apparatus of claim 1, wherein said vertical frame loading means includes a jack mechanism having a proximal portion mounted to said frame and a distal portion that can be extended away from said frame and forced against the ground surface to urge said frame upward to simulate the lifting force that would be applied to a premanufactured building.

6. The testing apparatus of claim 5, wherein said jack mechanism includes wheels rotatably mounted to the distal portion of said jack mechanism such that said wheels are forced against the ground when said jack mechanism is extended to urge the frame upward and wherein said testing apparatus can be transported on said wheels.

7. The testing apparatus of claim 5, wherein said jack mechanism is configured as a hydraulic scissors jack including an extensible hydraulic piston mounted to said frame that can extend the distal portion of said jack mechanism away from said frame or retract the distal portion of said jack mechanism toward said frame.

8. The testing apparatus of claim 5, further including a compression measuring device adapted for placement between the distal portion of said jack mechanism and the ground surface, said compression measuring device capable of measuring the amount of lifting force applied to said frame.

9. The testing apparatus of claim 1, further including support piers in supporting relationship with said support beams and adapted for placement between said support beams and the ground surface, said support piers simulating support piers of a premanufactured building.

10. Testing apparatus for testing a premanufactured building tie down system designed to resist the effects of potential wind forces imposed on a premanufactured building having spaced, horizontal support beams resting on support piers supported by a ground surface, the testing apparatus comprising:

a pair of elongated, spaced, horizontal parallel support beams that simulate the support beams of a premanufactured building;

a frame mounted to said support beams that simulates a cross-section of a premanufactured building;

vertical frame loading means mounted to said frame for providing a lifting force to said frame which simulates a lifting force of wind applied to a premanufactured building;

horizontal frame loading means mounted to said frame for providing a horizontal force to said frame which simulates a horizontal force of wind applied to a premanufactured building; and force measurement means for measuring the lifting force applied to said frame by said vertical frame loading means and for measuring the horizontal force applied to said frame by the horizontal frame loading means.

11. The testing apparatus of claim 10, wherein said horizontal frame loading means includes a winch mounted to the frame and a load cable having a first end wound about said winch and a second end adapted to attach to a fixed stationary object, said winch capable of applying a horizontal force to said frame when the load cable is tensioned by being further wound about said winch against the resistance of the stationary object.

12. The testing apparatus of claim 11, wherein said winch is hydraulically actuated and is slidably mounted to a center portion of said frame and said horizontal frame loading means further includes a retainer cable mounted to a windward end of said frame distal from the fixed stationary object and operably connected to said hydraulic winch such that the horizontal force is applied to said frame at the windward end to accurately simulate the horizontal force of wind that would be applied to a premanufactured building.

13. The testing apparatus of claim 12, wherein said force measuring means includes a tension measuring device mounted between said retainer cable and said hydraulic winch, said tension measuring device capable of measuring tension in said load cable and therefore the horizontal force applied to said frame.

14. The testing apparatus of claim 10, wherein said vertical frame loading means includes a jack mechanism having a proximal portion mounted to the frame and a distal portion that can be extended away from said frame and forced against the ground surface to urge said frame upward to simulate the lifting force that would be applied to a premanufactured building.

15. The testing apparatus of claim 14, wherein said jack mechanism includes wheels rotatably mounted to the distal portion of said jack mechanism such that said wheels are forced against the ground when said jack mechanism is extended to urge said frame upward and wherein said testing apparatus can be transported on said wheels.

16. The testing apparatus of claim 14, wherein said jack mechanism is configured as a hydraulic scissors jack including an extensible hydraulic piston mounted to said frame that can extend the distal portion of said jack mechanism away from said frame or retract the distal portion of said jack mechanism toward said frame.

17. The testing apparatus of claim 14, further including a compression measuring device adapted for placement between the distal portion of said jack mechanism and the ground surface, said compression measuring device capable of measuring the amount of lifting force applied to said frame.

18. The testing apparatus of claim 10, further including support piers in supporting relationship with said support beams and adapted for placement between said support beams and the ground surface, said support piers simulating support piers of a premanufactured building.

19. Testing apparatus for testing a premanufactured building tie down system designed to resist the effects of potential wind forces imposed on a premanufactured building having spaced, horizontal support beams resting on support piers supported by a ground surface, the testing apparatus comprising:

a pair of elongated, spaced, horizontal support beams that simulate the support beams of a premanufactured building;

a frame mounted to said support beams that simulates a cross-section of a premanufactured building;

a jack mechanism mounted to the frame that can be extended away from said frame and forced against the ground surface to urge said frame upward to simulate a lifting force of wind applied to a premanufactured building;

a tensioning mechanism mounted to said frame and including a load cable having a first end operably connected to said frame and a second end adapted to attach to a fixed stationary object, wherein said tensioning mechanism tensions said cable against the resistance of the fixed stationary object to simulate a horizontal force of wind applied to a premanufactured building; and force measurement means for measuring the lifting force applied to said frame by said jack mechanism and for measuring the horizontal force applied to said frame by said tensioning mechanism.

20. The testing apparatus of claim 19, wherein said tensioning mechanism further includes a winch mounted to said frame and the first end of said load cable is wound about said winch such that tension can be applied to said load cable by further winding it around said winch.

21. The testing apparatus of claim 19, wherein said jack mechanism includes a proximal portion mounted to said frame, a distal portion extendible away from said frame, and a hydraulic piston mounted to said frame which urges the distal portion of said jack mechanism against the ground surface to urge said frame upward to simulate the lifting force applied to the premanufactured building.

22. The testing apparatus of claim 19, further including support piers in supporting relationship with said support beams and adapted for placement between said support beams and the ground surface, said support piers simulating support piers of a premanufactured building.

* * * * *